(12) United States Patent
Kiyota

(10) Patent No.: US 12,437,903 B2
(45) Date of Patent: Oct. 7, 2025

(54) GROMMET AND WIRE HARNESS

(71) Applicant: YAZAKI CORPORATION, Tokyo (JP)

(72) Inventor: Hirotaka Kiyota, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 190 days.

(21) Appl. No.: 18/398,131

(22) Filed: Dec. 27, 2023

(65) Prior Publication Data

US 2024/0136091 A1 Apr. 25, 2024

Related U.S. Application Data

(63) Continuation of application No. PCT/JP2022/041849, filed on Nov. 10, 2022.

(30) Foreign Application Priority Data

Dec. 15, 2021 (JP) ................................ 2021-203190

(51) Int. Cl.
*H01B 17/58* (2006.01)

(52) U.S. Cl.
CPC .................. *H01B 17/583* (2013.01)

(58) Field of Classification Search
CPC .. H02G 3/22; H02G 3/24; H02G 3/26; H02G 3/28; H02G 3/30; H02G 3/36; B60R 16/02; B60R 16/00; B60R 16/0207; H01B 17/58; H01B 17/30; H01B 17/303; H01B 17/56
USPC .... 174/152 G, 153 G, 152 R, 650, 135, 142; 16/2.1, 2.2; 248/56, 68.1, 49
See application file for complete search history.

(56) References Cited

U.S. PATENT DOCUMENTS

| | | | |
|---|---|---|---|
| 6,088,875 A * | 7/2000 | Ono ..................... | B60R 16/0222 174/153 G |
| 6,119,305 A * | 9/2000 | Loveall ................ | H05K 9/0018 174/152 G |
| 6,297,457 B1 * | 10/2001 | Yamada .............. | B60R 16/0222 174/152 G |
| 6,822,165 B2 * | 11/2004 | Nishimoto .......... | B60R 16/0222 174/152 G |

(Continued)

FOREIGN PATENT DOCUMENTS

JP H08-251769 A 9/1996

*Primary Examiner* — Angel R Estrada
(74) *Attorney, Agent, or Firm* — KENEALY VAIDYA LLP

(57) ABSTRACT

A grommet includes: a base member, a waterstop member, and a holding mechanism. The base member includes: a flange that causes an outer peripheral edge to face the peripheral edge with a gap; a tubular body that protrudes from an inner peripheral edge of the flange and allows passage of a wiring member inside the body; and a cylindrical body that protrudes from the flange so as to be inserted through the through hole. The waterstop member includes: a first waterstop member and a second waterstop member in an integrated state outside a radial direction. The first waterstop member covers an annular wall surface. The second waterstop member is in close contact with an outer circumferential surface of the outer peripheral edge over one circumference in the circumferential direction. The second waterstop member has a contact portion configured be in close contact with the peripheral edge.

4 Claims, 10 Drawing Sheets

(56) References Cited

U.S. PATENT DOCUMENTS

| | | | | |
|---|---|---|---|---|
| 6,901,627 | B2* | 6/2005 | Uchida | H02G 3/0468 |
| | | | | 16/2.1 |
| 8,704,098 | B2* | 4/2014 | Agusa | B60R 16/0222 |
| | | | | 174/152 G |
| 8,816,210 | B2* | 8/2014 | Yoshimura | H02G 3/0406 |
| | | | | 174/152 G |
| 8,975,524 | B2* | 3/2015 | Kanai (Popovici) | |
| | | | | H02G 3/0468 |
| | | | | 174/152 G |

\* cited by examiner

GROMMET AND WIRE HARNESS

CROSS-REFERENCE TO RELATED APPLICATION(S)

This application is a continuation application of International Application No. PCT/JP2022/041849 filed on Nov. 10, 2022 which claims the benefit of priority from Japanese Patent Application No. 2021-203190 filed on Dec. 15, 2021 and designating the U.S., the entire contents of which are incorporated herein by reference.

BACKGROUND OF THE INVENTION

1. Field of the Invention

The present invention relates to a grommet and a wire harness.

2. Description of the Related Art

In a conventional wire harness, a wiring member such as an electric wire is inserted through a through hole provided in a wall body (such as a panel of a vehicle body in a vehicle, for example) to route the wiring member from one space to the other space separated by the wall body. Therefore, in order to protect the wiring member from a peripheral edge of the through hole and to prevent entry of a liquid to a gap between the through hole and the wiring member, a grommet to close the gap is attached to the wall body. For example, the grommet includes: a cylindrical portion through which the wiring member is inserted; and a fitting portion provided on an outer peripheral wall of the cylindrical portion so as to be fitted into a peripheral edge of the through hole in the wall body, and is split into two members along a central axis of the cylindrical portion (Japanese Patent Application Laid-open No. 8-251769). The grommet is formed of a flexible synthetic resin material such as rubber.

In the grommet of the split structure, effectively suppressing the occurrence of a gap due to the positional deviation between the members is important for improving the waterproofness. The conventional grommet has room for improvement in that respect.

SUMMARY OF THE INVENTION

In view of this, an object of the present invention is to provide a grommet and a wire harness capable of improving waterproofness.

In order to achieve the above mentioned object, a grommet according to one aspect of the present invention includes a base member which is formed of an insulating hard resin and through which a wiring member being a conductive member and passing through a through hole of a flat plate portion is inserted; a waterstop member having an annular shape and assembled to the base member; and a holding mechanism that holds the base member and the waterstop member assembled with each other onto a peripheral edge of the through hole in the flat plate portion, wherein the base member includes: a flange having an annular shape and in which an outer peripheral edge having a shape similar to the peripheral edge having an annular shape is disposed to face the peripheral edge with a gap in one hole axial direction of the through hole and the wiring member is inserted through an inside of an inner peripheral edge; a tubular body that protrudes from the inner peripheral edge of the flange in the one hole axial direction and allows passage of the wiring member inside the body; and a cylindrical body whose cross section orthogonal to a hole axis of the through hole has a shape similar to the peripheral edge, the cylindrical body protruding from the flange in the other hole axial direction of the through hole inside the outer peripheral edge so as to be inserted through the through hole, the waterstop member includes a first waterstop member and a second waterstop member in an integrated state outside a radial direction, the first waterstop member having an annular shape, formed of the hard resin or a hard resin different from the hard resin having a hardness equivalent to a hardness of the hard resin, and configured to cover an annular wall surface on the one hole axial direction side in the outer peripheral edge of the flange over one circumference in a circumferential direction, the second waterstop member having an annular shape, formed of a soft resin softer than the hard resin and elastically deformable, and configured to be in close contact with at least an outer circumferential surface of the outer peripheral edge of the flange over one circumference in the circumferential direction, and the second waterstop member has a contact portion having an annular shape and configured to be, in elastically deformed state, in close contact with the peripheral edge over one circumference in the circumferential direction.

In order to achieve the above mentioned object, a wire harness according to another aspect of the present invention includes a wiring member being a conductive member; and a grommet through which the wiring member is inserted, wherein the grommet includes: a base member which is formed of an insulating hard resin and through which the wiring member passing through a through hole of a flat plate portion is inserted; a waterstop member having an annular shape and assembled to the base member; and a holding mechanism that holds the base member and the waterstop member assembled with each other onto a peripheral edge of the through hole in the flat plate portion, the base member includes: a flange having an annular shape and in which an outer peripheral edge having a shape similar to the peripheral edge having an annular shape is disposed to face the peripheral edge with a gap in one hole axial direction of the through hole and the wiring member is inserted through an inside of an inner peripheral edge; a tubular body that protrudes from the inner peripheral edge of the flange in the one hole axial direction and allows passage of the wiring member inside the body; and a cylindrical body whose cross section orthogonal to a hole axis of the through hole has a shape similar to the peripheral edge, the cylindrical body protruding from the flange in the other hole axial direction of the through hole inside the outer peripheral edge so as to be inserted through the through hole, the waterstop member includes a first waterstop member and a second waterstop member in an integrated state outside a radial direction, the first waterstop member having an annular shape, formed of the hard resin or a hard resin different from the hard resin having a hardness equivalent to a hardness of the hard resin and configured to cover an annular wall surface on the one hole axial direction side in the outer peripheral edge of the flange over one circumference in a circumferential direction, the second waterstop member having an annular shape, formed of a soft resin softer than the hard resin and elastically deformable, and configured to be in close contact with at least an outer circumferential surface of the outer peripheral edge of the flange over one circumference in the circumferential direction, and the second waterstop member has a contact portion having an annular shape and configured to be, in elastically deformed state, in close contact with the peripheral edge over one circumference in the circumferential direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
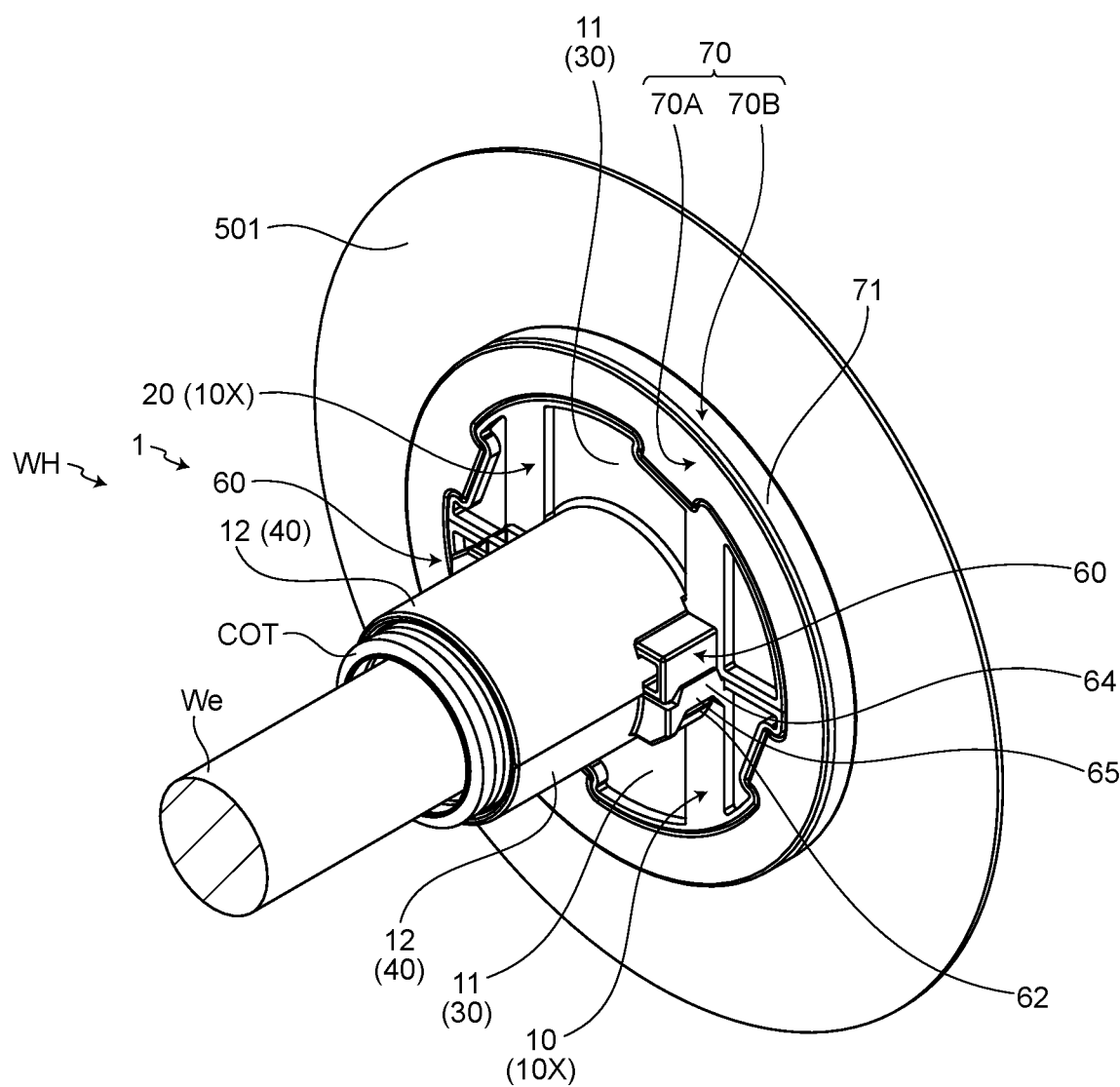
FIG. 1 is a perspective view illustrating a grommet and a wire harness according to an embodiment.

Hereinafter, embodiments of a grommet and a wire harness according to the present invention will be described in detail with reference to the drawings. Note that the present invention is not limited by the embodiment.

Embodiment

One of embodiments of a grommet and a wire harness according to the present invention will be described with reference to FIGS. 1 to 10.

Reference numeral 1 in FIGS. 1 to 7 denotes a grommet according to the present embodiment. Reference numeral WH in FIGS. 1 to 4 denotes a wire harness of the present embodiment. The grommet 1 protects a wiring member We being a conductive member to be inserted through a through hole 502 of a flat plate portion 501 against a peripheral edge 501a of the through hole 502 in the flat plate portion 501, and prevents entry of a liquid (such as water) into a gap between the peripheral edge 501a and the wiring member We (FIGS. 1 to 4). Therefore, with the wiring member We inserted through the grommet 1, the grommet 1 is installed at the through hole 502 of the flat plate portion 501 so as to be attached to the peripheral edge 501a. The wire harness WH described herein includes the grommet 1 and the wiring member We. The wire harness WH includes at least one wiring member We.

Figure 4:
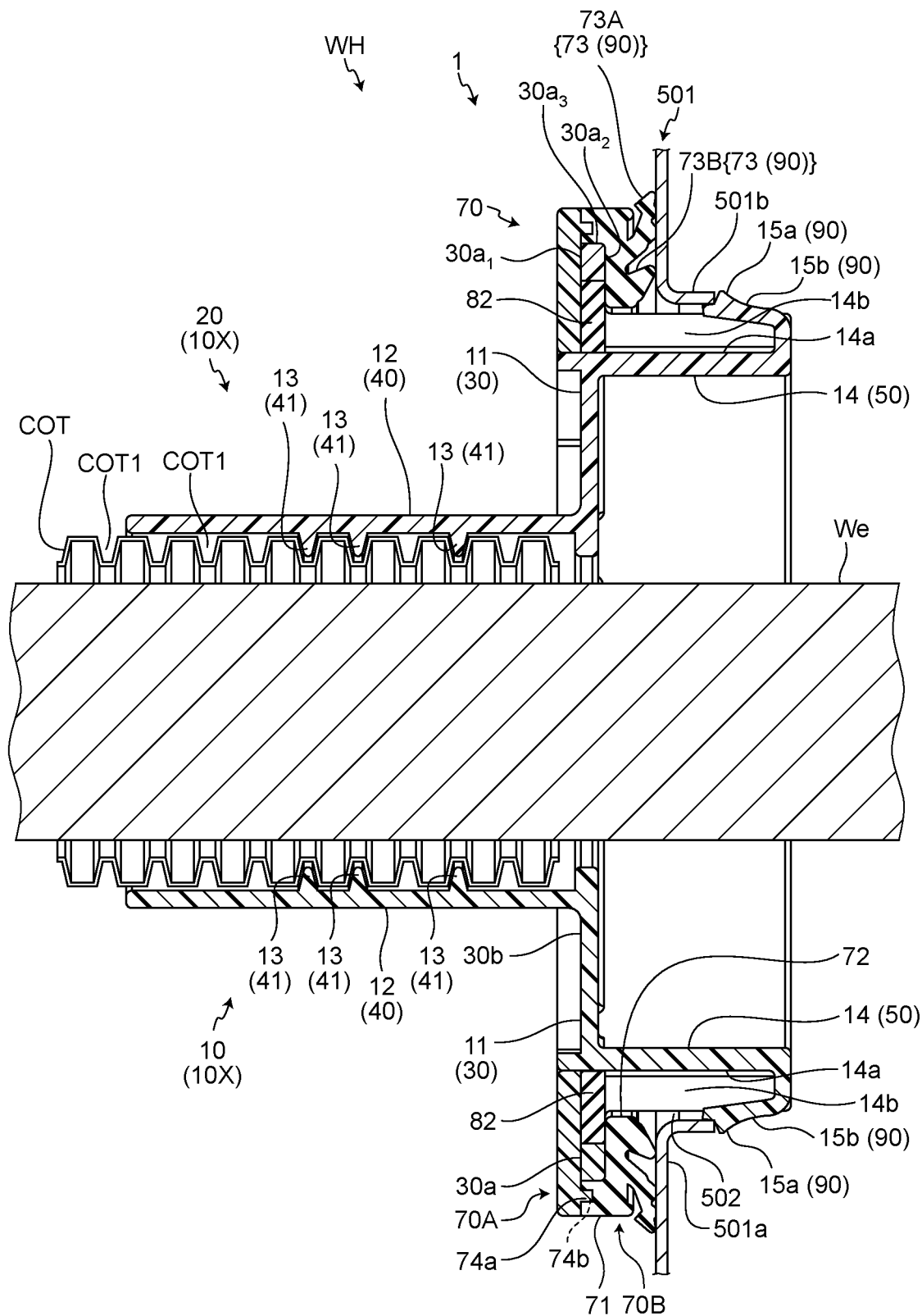
FIG. 4 is a view illustrating a cross section taken along line X-X in FIG. 3.

Here, an example of the wiring member We is an electric wire (electric wire as communication wire, electric wire as power supply wire, etc.). When the wire harness WH includes a plurality of the wiring members We, all or at least a part of the plurality of wiring members We excluding both ends are bundled together by an exterior component such as a corrugated tube or a resin tape. The wire harness WH illustrated here includes a plurality of wiring members We, and a part thereof is covered with a corrugated tube COT (FIGS. 1 and 4). In addition, for example, in the case of a vehicle, the flat plate portion 501 refers to a part of a wall body such as a panel of a vehicle body, being a portion formed in a flat plate shape. The shape of the flat plate portion 501 is not necessarily limited to the annular shape in the drawing. The wiring member We is inserted through the through hole 502 of the flat plate portion 501 so as to be routed between two spaces separated by the wall body. For example, the wiring member We is used for purposes such as communication between devices in each space and power supply from a power source in one space to an electric device in the other space. The flat plate portion 501 illustrated here has the through hole 502 having a circular shape. In addition, here, with the flat plate portion 501 as a boundary, one side of the through hole 502 in a hole axial direction is located on a vehicle exterior side, while the other side of the through hole 502 in the hole axial direction is located on a vehicle interior side.

The grommet 1 includes a base member 10X through which the wiring member We passing through the through hole 502 of the flat plate portion 501 is inserted (FIGS. 1 to 7). The base member 10X may be formed of one member or may be formed by assembling a plurality of members. The base member 10X illustrated here includes a first base member 10 and a second base member 20 to be assembled to each other (FIGS. 1 to 7). The base member 10X coaxially includes a flange 30 having an annular shape, a tubular body 40, and a cylindrical body 50, and the wiring member We is inserted through the inside of these members (FIGS. 2 and 4 to 7). Here, the configuration coaxially includes the tubular body 40 protruding from the flange 30 toward one side and the cylindrical body 50 protruding from the flange 30 toward the other side. As described below, the base member 10X illustrated here has a configuration in which the annular flange 30, the tubular body 40, and the cylindrical body 50 are coaxially formed by the first base member 10 and the second base member 20 assembled to each other. For this purpose, there is provided, between the first base member 10 and the second base member 20, a holding mechanism (hereinafter, referred to as a "base holding mechanism") 60 that holds the first base member 10 and the second base member 20 in an assembled state (FIGS. 1, 3, and 5 to 7).

In addition, the grommet 1 includes a waterstop member 70 having an annular shape and configured to be assembled to the base member 10X (formed with the first base member 10 and the second base member 20 assembled to each other) (FIGS. 1 to 7). The waterstop member 70 covers an outer peripheral edge 30a of the flange 30 (FIGS. 4 to 7) to prevent entry of a liquid (water or the like) into the gap between the peripheral edge 501a of the through hole 502 in the flat plate portion 501 and the flange 30. The waterstop member 70 illustrated here includes a first waterstop member 70A having an annular shape and a second waterstop member 70B having an annular shape are integrated on the outer side in the radial direction (FIGS. 1, 2, 4 to 7, 9, and 10).

The grommet 1 adopts a multi-member integrated structure in which a plurality of members having different hardness is integrated. In the grommet 1, the base member 10X (the first base member 10 and the second base member 20) and the first waterstop member 70A are formed to be harder than the second waterstop member 70B, and the second waterstop member 70B is formed to be softer than the base member 10X (the first base member 10 and the second base member 20) and the first waterstop member 70A and be flexible. In other words, in the grommet 1, the main portions of each of the first base member 10 and the second base member 20 are formed to suppress elastic deformation due to an external force and in addition, the first waterstop member 70A is formed to suppress elastic deformation due to an external force. Furthermore, in the grommet 1, the second waterstop member 70B is formed so as to undergo elastic deformation by an external force. The base member 10X (the first base member 10 and the second base member 20) is formed of an insulating hard resin using a synthetic resin material such as plastic, for example. In addition, the first waterstop member 70A is formed of either the same hard resin as the base member 10X or a hard resin different from the hard resin having hardness equivalent to that of the hard resin of the base member 10X, and an example of this is a synthetic resin material such as plastic. In addition, the second waterstop member 70B is formed of a soft resin that is softer than the hard resin used in the base member 10X (the first base member 10 and the second base member 20) and the first waterstop member 70A and that is elastically deformable, and an example of this is a synthetic resin material such as elastomer.

The first base member 10 and the second base member 20 may be members having different shapes, or may be same members having same shapes. In the grommet 1 illustrated here, the same members having the same shapes are used for the first base member 10 and the second base member 20.

Figure 3:
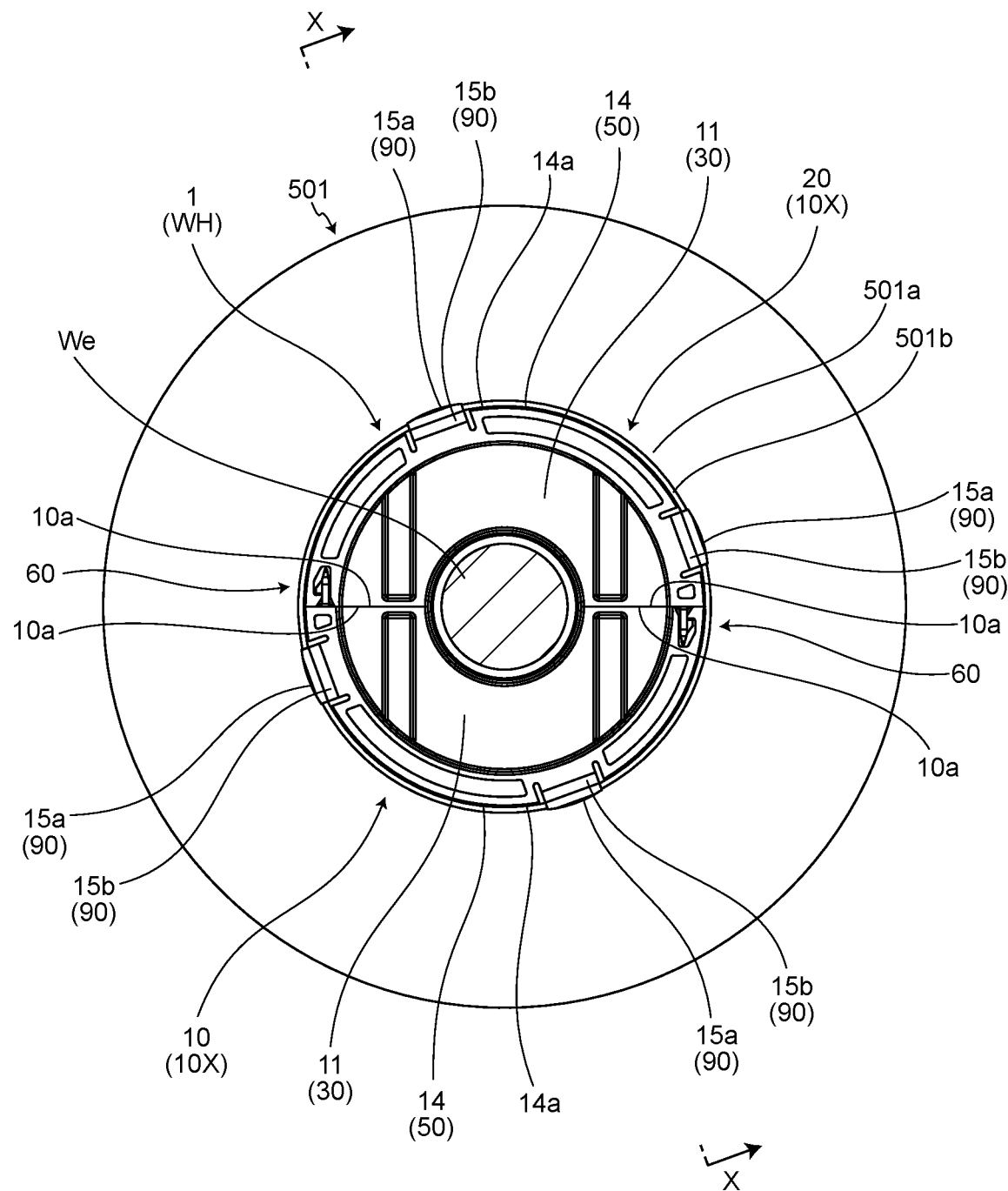
FIG. 3 is a plan view of the grommet and the wire harness of the embodiment as viewed from a vehicle interior side.
Figure 5:
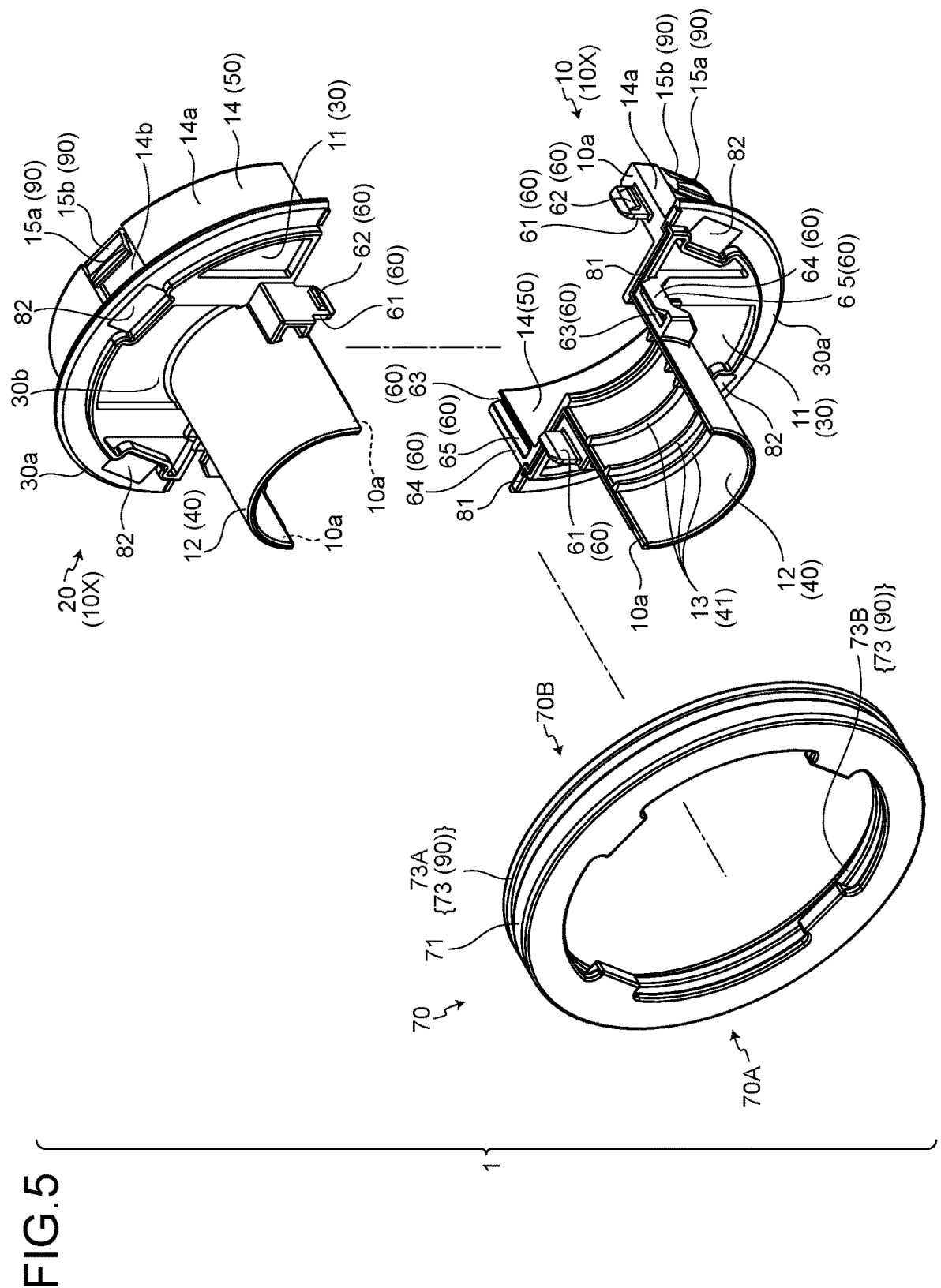
FIG. 5 is an exploded perspective view illustrating the grommet of the embodiment.
Figure 6:
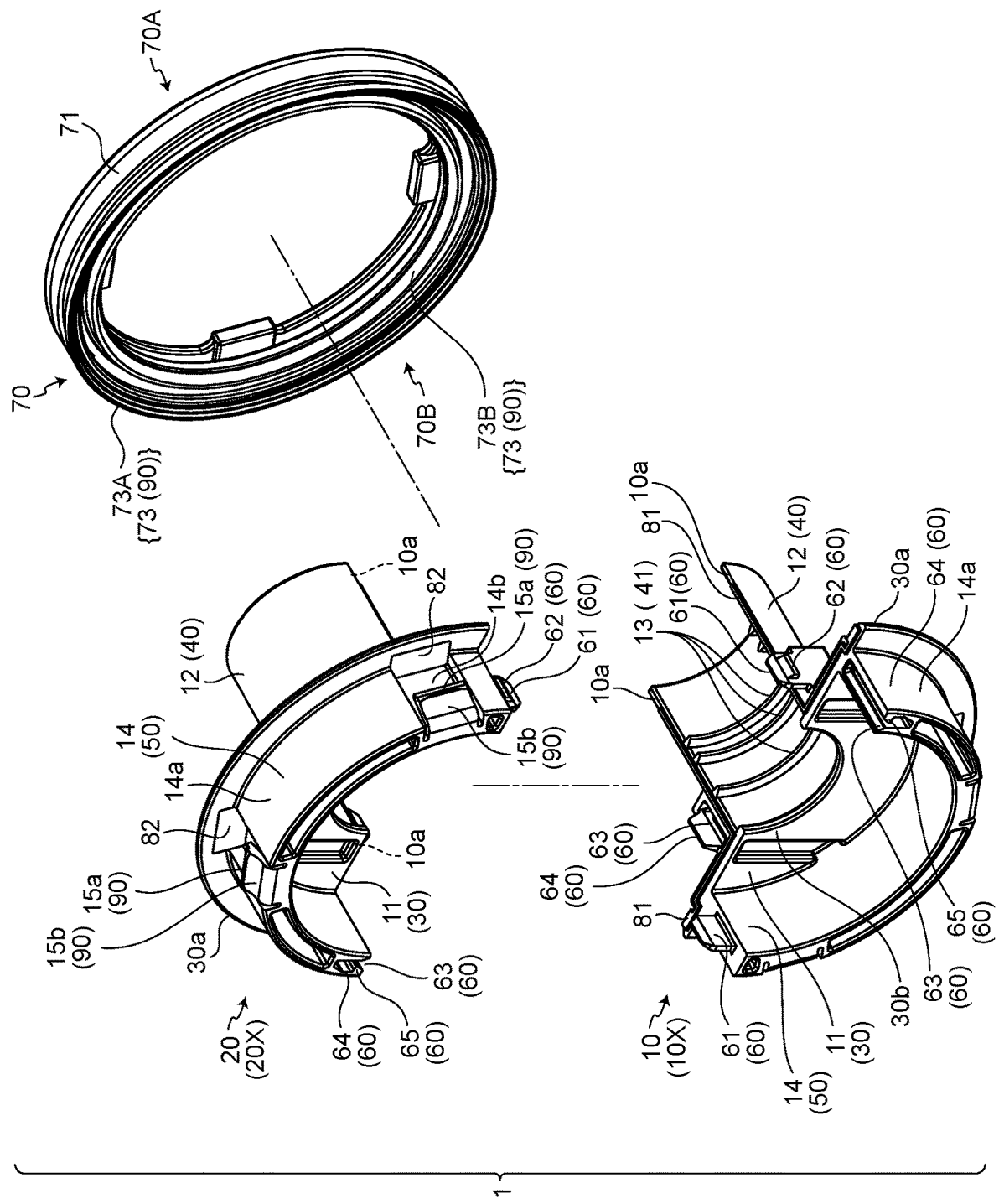
FIG. 6 is an exploded perspective view of the grommet of the embodiment as viewed from another angle.

The first base member 10 and the second base member 20 are assembled to each other with their joint surfaces 10a aligned together (FIGS. 3, 5, and 6). The first base member 10 and the second base member 20 in this assembled state sandwich the wiring member We so as to have a state in which the wiring member We is inserted through the members. Here, the first base member 10 and the second base member 20 assembled to each other to form the annular flange 30, the tubular body 40 having a tubular shape, and the cylindrical body 50 having a cylindrical shape. Here, the tubular body 40 being a straight tube is taken as an example. Alternatively, the tubular body 40 may be bent after protruding from the flange 30.

Figure 7:
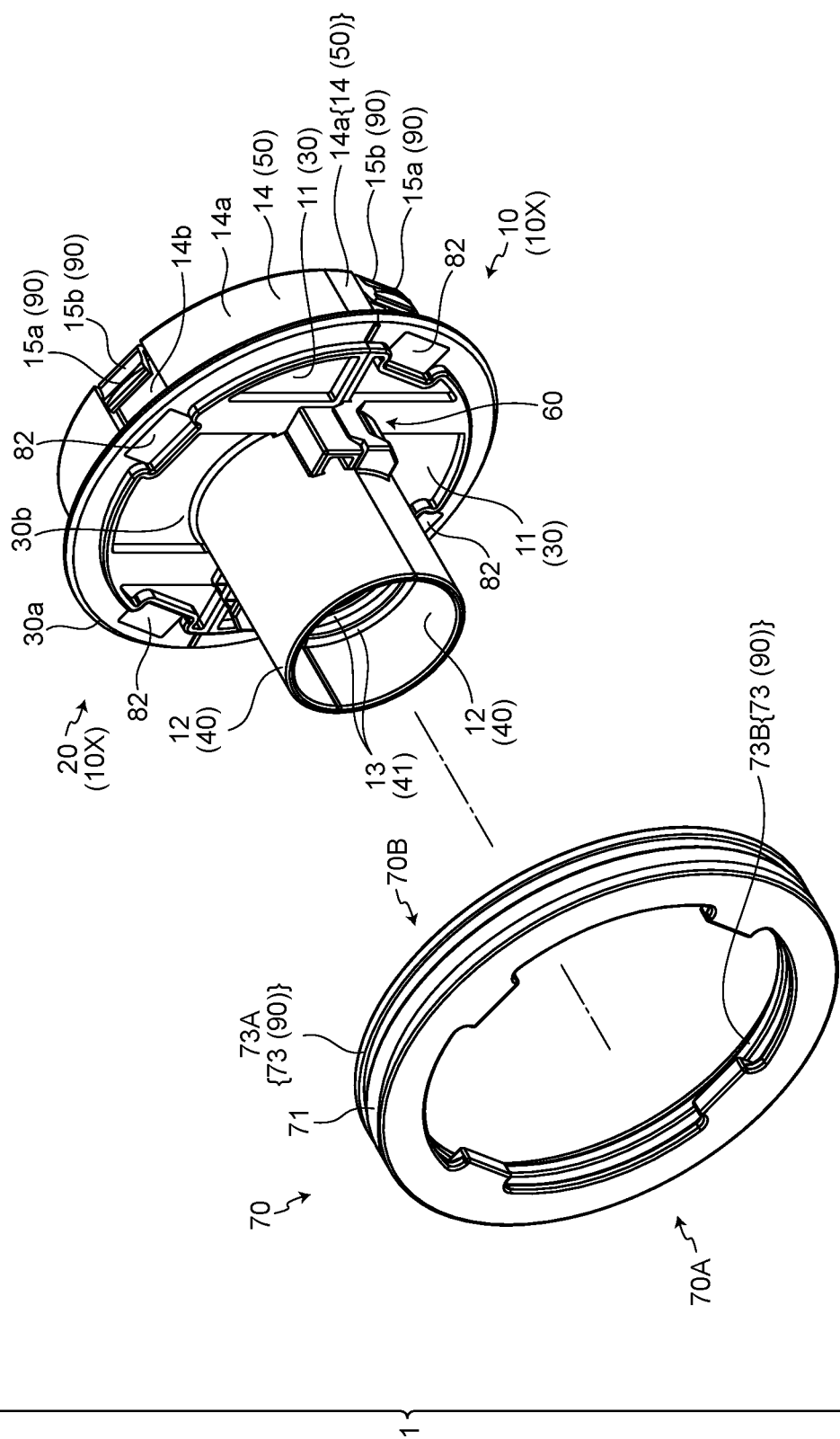
FIG. 7 is an exploded perspective view separately illustrating the grommet of the embodiment as a first base member, a second base member, and a waterstop member.

The flange 30 has the outer peripheral edge 30a similar in shape to the annular peripheral edge 501a of the flat plate portion 501 (FIG. 7). When the grommet 1 is attached to the peripheral edge 501a of the flange 30, the outer peripheral edge 30a is disposed to face the peripheral edge 501a with a gap in one hole axial direction of the through hole 502 (FIG. 4). The outer peripheral edge 30a and the peripheral edge 501a are disposed to face each other over one circumference in the circumferential direction. In the flange 30, the wiring member We is inserted through the inside of an inner peripheral edge 30b (FIG. 4). The flange 30 illustrated here is formed in an annular plate shape, and has the outer peripheral edge 30a having an annular shape and the inner peripheral edge 30b having an annular shape.

Each of the first base member 10 and the second base member 20 has a split flange 11 having joint surfaces 10a of which aligned together to form the flange 30 (FIGS. 1 to 7). The split flange 11 illustrated here is a half split piece of the flange 30 along the central axis, and is formed in a semicircular arc shape.

The tubular body 40 coaxially protrudes to one side from the inner peripheral edge 30b of the flange 30 (FIG. 4). When the grommet 1 is attached to the peripheral edge 501a of the flat plate portion 501, the tubular body 40 protrudes from the inner peripheral edge 30b of the flange 30 in one hole axial direction of the through hole 502. In addition, the tubular body 40 allows passage of the wiring member We inside the body.

Each of the first base member 10 and the second base member 20 has a split tube 12 having joint surfaces 10a of which aligned together to form the tubular body 40 (FIGS. 1, 2, and 4 to 7). The split tube 12 illustrated here is a half split piece of the tubular body 40 along the central axis, and is formed in a semicircular arc shape.

Here, a corrugated tube COT through which the wiring member We is inserted is disposed inside the tubular body 40 (FIGS. 1 and 4). The tubular body 40 has a protrusion 41 having an annular shape and protruding annularly from the inner circumferential surface over one circumference in the circumferential direction so as to be fitted to a valley COT 1 being an annular portion of the corrugated tube COT in the tubular body 40 (FIG. 4). The tubular body 40 coaxially has a plurality of protrusions 41 having annular shapes, and holds the corrugated tube COT inside by the plurality of protrusions 41. Furthermore, the plurality of protrusions 41 with annular shapes can extend a creepage distance with respect to the valley COT 1 having an annular shape, suppressing passage of liquid (water or the like) through a gap between the inner circumferential surface of the tubular body 40 and the corrugated tube COT.

Each of the first base member 10 and the second base member 20 includes a split protrusion 13 having joint surfaces 10a of which aligned together to form a protrusion 41 (FIG. 4). The split protrusion 13 illustrated here is a half split piece of the protrusion 41 along the central axis, and is formed in a semicircular arc shape.

Figure 2:
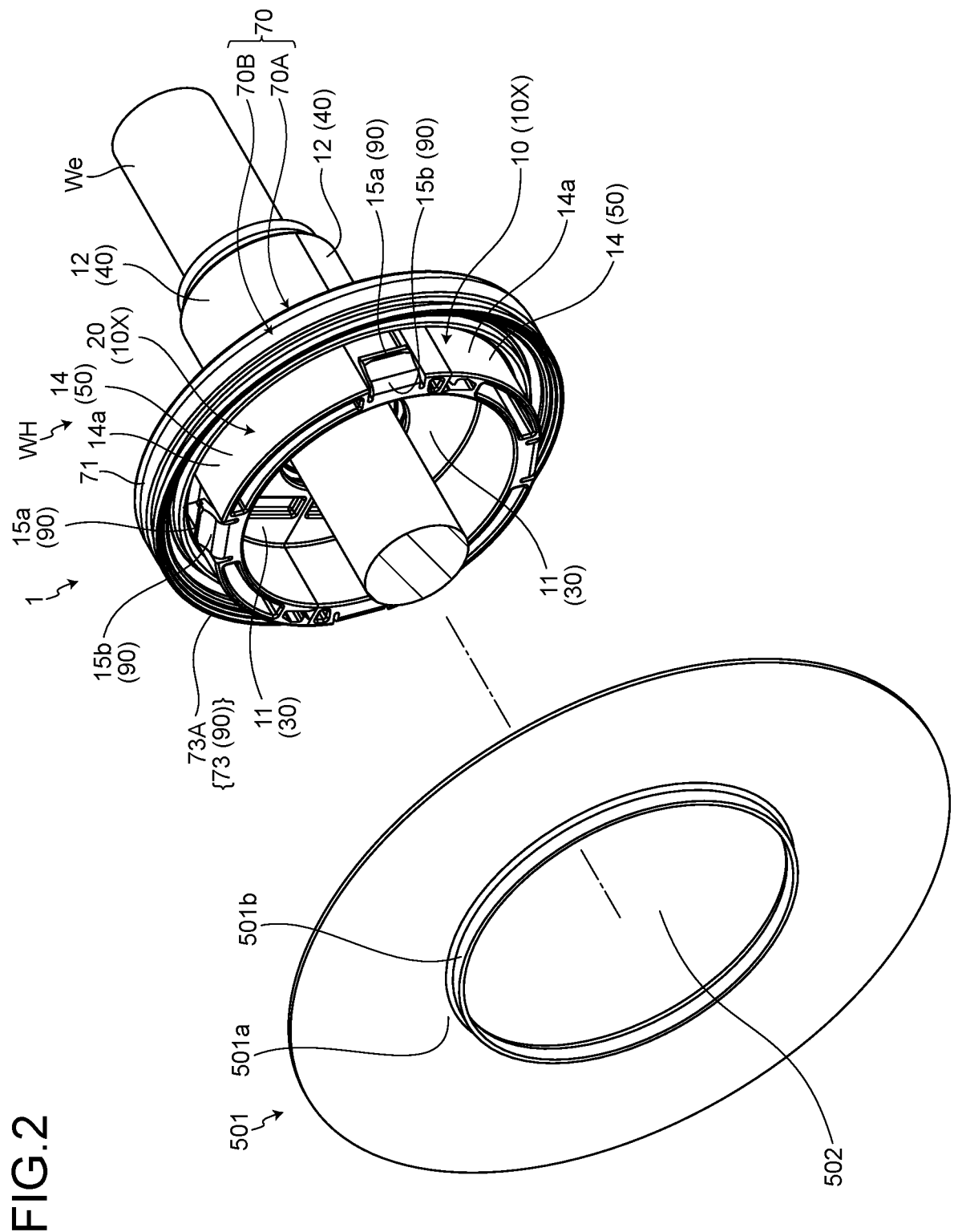
FIG. 2 is a perspective view of the grommet and the wire harness of the embodiment as viewed from another angle.

The cylindrical body 50 has a cross section orthogonal to its cylinder axis similar in shape to that of the peripheral edge 501a of the flat plate portion 501, and coaxially protrudes from the flange 30 to the other side (that is, the direction is opposite to the direction of the tubular body 40) inside the outer peripheral edge 30a (FIGS. 2 and 4). When the grommet 1 is attached to the peripheral edge 501a of the flat plate portion 501, the cylindrical body 50 has a cross section orthogonal to the hole axis of the through hole 502 similar in shape to that of the peripheral edge 501a of the flat plate portion 501, and protrudes from the flange 30 in the other hole axial direction of the through hole 502 inside the outer peripheral edge 30a. The cylindrical body 50 is inserted through the through hole 502 when the grommet 1 is attached to the peripheral edge 501a of the flat plate portion 501. The cylindrical body 50 allows passage of the wiring member We inside the body.

Each of the first base member 10 and the second base member 20 has a split cylinder 14 having joint surfaces 10a of which aligned together to form the cylindrical body 50 (FIGS. 2 to 7). The split cylinder 14 illustrated here is a half split piece of the cylindrical body 50 along the central axis, and is formed in a semicircular arc shape.

In this manner, the main portions (the split flange 11, split tube 12, split cylinder 14) of the first base member 10 and the second base member 20 have high hardness enough to suppress elastic deformation. Therefore, even when the joint surfaces 10a of the first base member 10 and the second base member 20 are aligned to each other, there is a possibility, for example, of occurrence of a fine gap between the joint surfaces 10a due to surface roughness or the like of the joint surfaces 10a. To handle this, the grommet 1 of the present embodiment includes, on at least one of the joint surfaces 10a of the first base member 10 and the second base member 20, a waterproof member (hereinafter, "first waterproof member") 81 formed of a soft resin that is softer than the above hard resin and elastically deformable so as to fill the gap between the individual joint surfaces 10a (FIGS. 5, 6, and 8).

The first waterproof member 81 is formed by using a synthetic resin material such as elastomer, for example. Here, in the grommet 1 of the present embodiment, the flange 30 and the tubular body 40 are disposed on the vehicle exterior side, and the cylindrical body 50 is disposed on the vehicle interior side. Therefore, the grommet 1 is mainly required to have an effect of suppressing entry of a liquid such as water into the vehicle interior from the vehicle exterior. Therefore, the first waterproof member 81 may be provided over the individual joint surfaces 10a of the split flange 11, the split tube 12, and the split cylinder 14, but it is just sufficient to provide the first waterproof member 81 over the individual joint surfaces 10a of the split flange 11 and the split tube 12.

Figure 8:
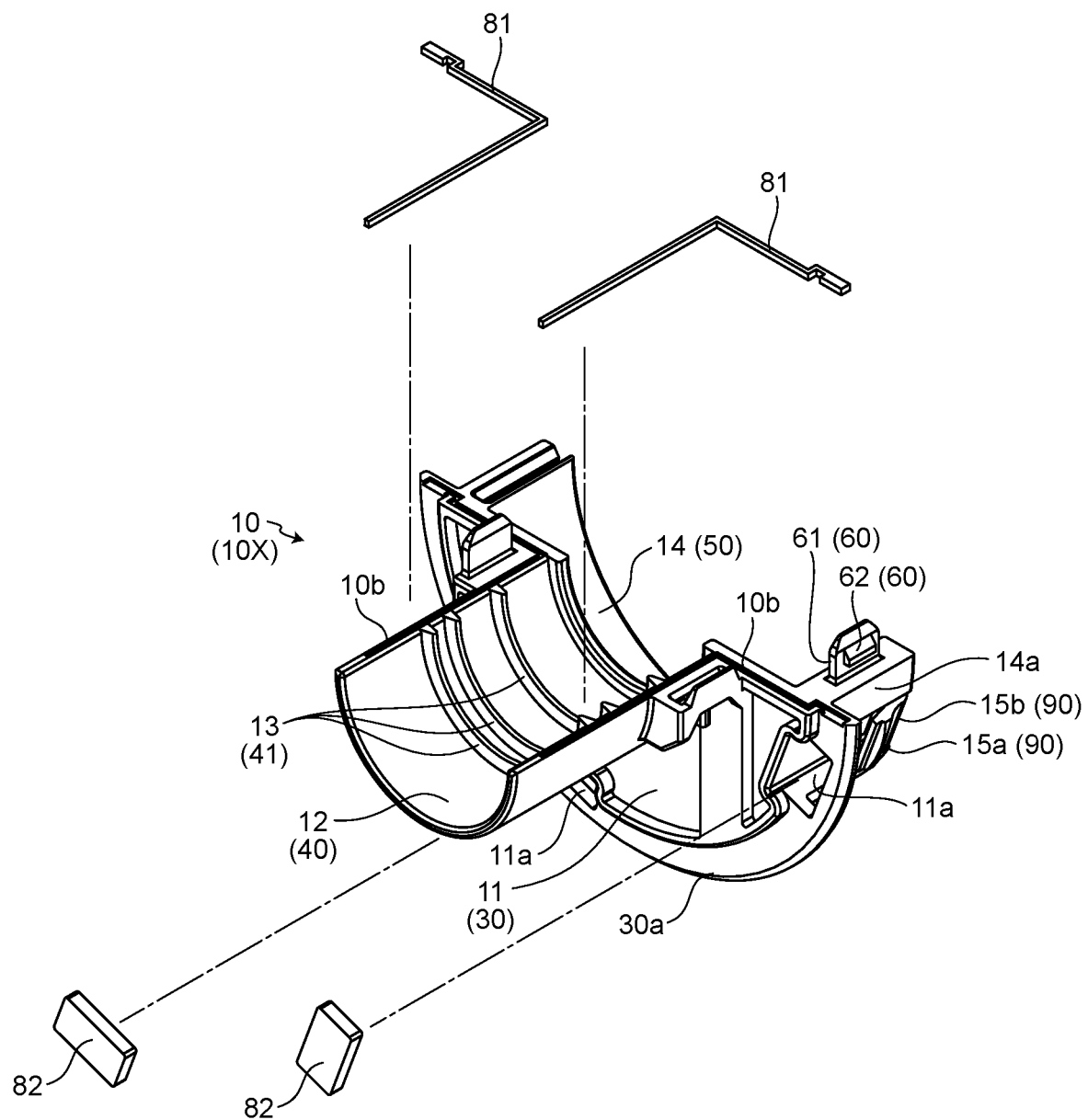
FIG. 8 is an exploded perspective view of the first base member and first and second waterproof members.

In each of the first base member 10 and the second base member 20 illustrated here, there is provided a groove 10b formed over the joint surface 10a of the split flange 11 to the joint surface 10a of the split tube 12, with the first waterproof member 81 fitted into each groove 10b (FIG. 8). The first waterproof member 81 is provided in one groove 10b of the first base member 10 and the second base member 20 and protrudes from the groove 10b. By assembling the first base member 10 and the second base member 20 to each other, the protrusion of the first waterproof member 81 is fitted into the other groove 10b. For example, the first waterproof member 81 may be created with two-color molding using one of the first base member 10 and the second base member 20, or may be formed as a separate component and attached to the one groove 10b of the first base member 10 and the second base member 20 with an adhesive or the like. Here, the first waterproof member 81 is provided in the groove 10b of the first base member 10.

The base holding mechanism 60 is a holding mechanism for holding the first base member 10 and the second base member 20 in a state where their individual joint surfaces 10a are aligned together. The base holding mechanism 60 is provided at a plurality of positions between the first base member 10 and the second base member 20. For example, the base holding mechanism 60 illustrated here includes: a piece portion 61 protruding from one joint surface 10a of the first base member 10 and the second base member 20; and a first locking portion 62 with a claw-like shape protruding from a wall surface of the piece portion 61 (FIGS. 5 and 6). Furthermore, the base holding mechanism 60 illustrated here includes: an insertion port 63 of the piece portion 61 and the first locking portion 62 provided in the other of the joint surface 10a of the first base member 10 and the second base member 20; a flexible portion 64 provided in the other of the first base member 10 and the second base member 20 to work in a manner such that the flexible portion 64 is bent when pressed against the first locking portion 62 inserted from the insertion port 63, and the bending is canceled because the first locking portion 62 is separated when the joint surfaces 10a of the members are aligned together; and a second locking portion 65 provided in the other of the first base member 10 and the second base member 20 to work in a manner such that the second locking portion 65 is disposed to face the first locking portion 62 when the joint surfaces 10a of the members are aligned together so as to hold the first base member 10 and the second base member 20 in a state where the individual joint surfaces 10a are aligned together (FIGS. 5 and 6).

Each of the first base member 10 and the second base member 20 illustrated here includes a set of the piece portion 61 and the first locking portion 62 at one end of the split tube 12 in the circumferential direction, and includes a set of the insertion ports 63, the flexible portion 64, and the second locking portion 65 at the other end of the split tube 12 in the circumferential direction. In the first base member 10 and the second base member 20, the first locking portion 62 at one end of one split tube 12 and the second locking portion 65 at the other end of the other split tube 12 are locked with each other, and the second locking portion 65 at the other end of one split tube 12 and the first locking portion 62 at one end of the other split tube 12 are locked with each other in a state where the individual joint surfaces 10a are aligned together. That is, the first base member 10 and the second base member 20 are provided with the base holding mechanism 60, which connects the individual split tubes 12 and holds the split tubes 12 in a connected state, at two locations. Furthermore, each of the first base member 10 and the second base member 20 includes a set of the piece portion 61 and the first locking portion 62 at one end of the split cylinder 14 in the circumferential direction, and includes a set of the insertion ports 63, the flexible portion 64, and the second locking portion 65 at the other end of the split cylinder 14 in the circumferential direction. In the first base member 10 and the second base member 20, the first locking portion 62 at one end of one split cylinder 14 and the second locking portion 65 at the other end of the other split cylinder 14 are locked with each other, and the second locking portion 65 at the other end of one split cylinder 14 and the first locking portion 62 at one end of the other split cylinder 14 are locked with each other in a state where the individual joint surfaces 10a are aligned together. That is, the first base member 10 and the second base member 20 are provided with the base holding mechanism 60, which connects the individual split cylinders 14 and holds the split cylinders 14 in a connected state, at two locations.

As described above, the waterstop member 70 includes the first waterstop member 70A, formed in an annular shape with a hard material, and the second waterstop member 70B, formed in an annular shape with a soft material, in an integrated state on the outer side in the radial direction.

The first waterstop member 70A is formed to cover an annular wall surface (hereinafter, referred to as a "first annular wall surface") $30a_1$ on one hole axial direction side of the outer peripheral edge 30a of the flange 30 over one circumference in the circumferential direction (FIG. 4). In the outer peripheral edge 30a, when the grommet 1 is attached to the peripheral edge 501a of the flat plate portion 501, the first annular wall surface $30a_1$ is disposed on one hole axial direction side of the through hole 502, while the annular wall surface (hereinafter, referred to as a "second annular wall surface") $30a_2$ on the other hole axial direction side of the outer peripheral edge 30a of the flange 30 is disposed on the other hole axial direction side of the through hole 502. The first waterstop member 70A illustrated here is formed as an annular flat plate capable of covering the first annular wall surface $30a_1$ having an annular shape in a close contact state over one circumference in the circumferential direction (FIGS. 9 and 10).

The second waterstop member 70B is formed to be in close contact with at least an outer circumferential surface $30a_3$ of the outer peripheral edge 30a of the flange 30 over one circumference in the circumferential direction, and to be, in elastically deformed state, in close contact with the peripheral edge 501a of the flat plate portion 501 over one circumference in the circumferential direction (FIG. 4).

Figure 9:
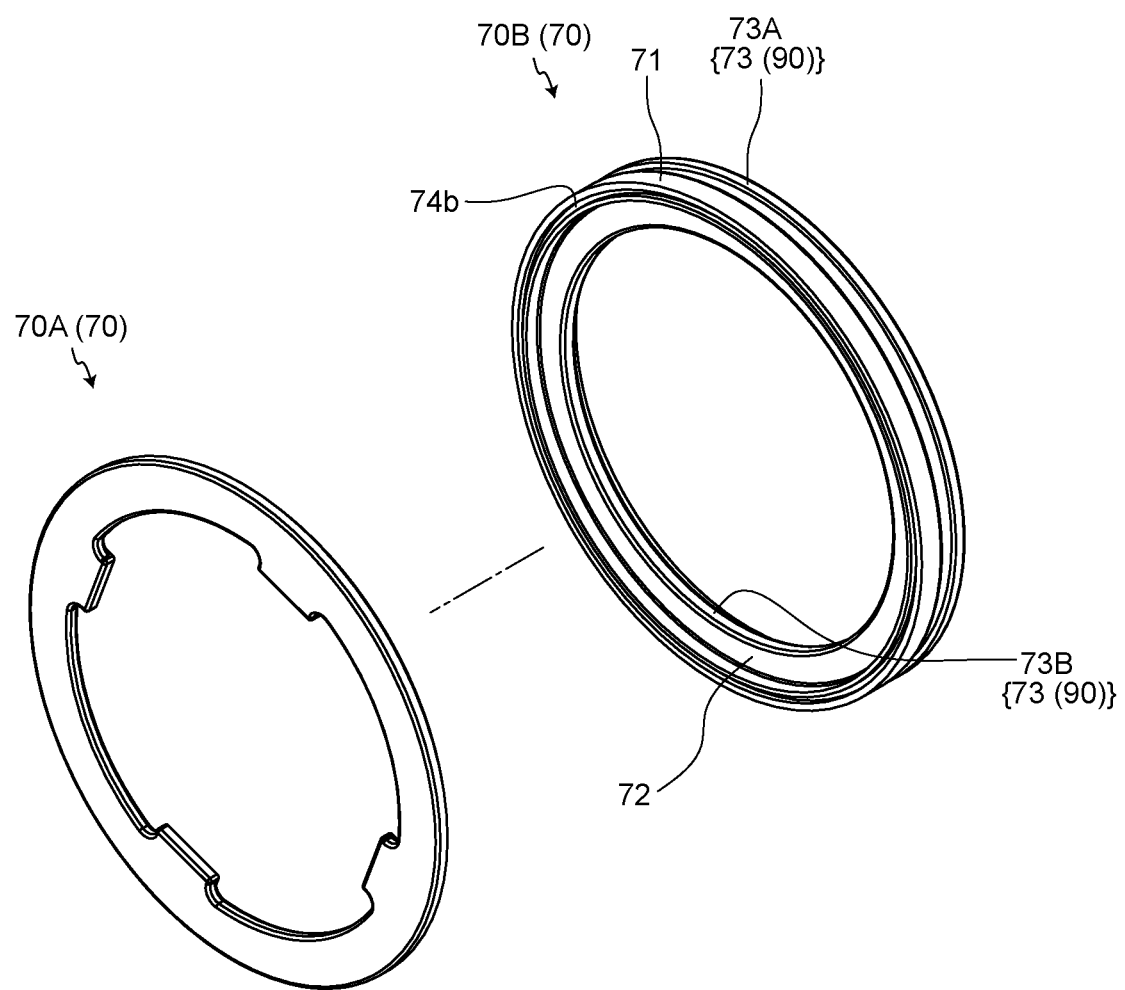
FIG. 9 is an exploded perspective view of the waterstop member.
Figure 10:
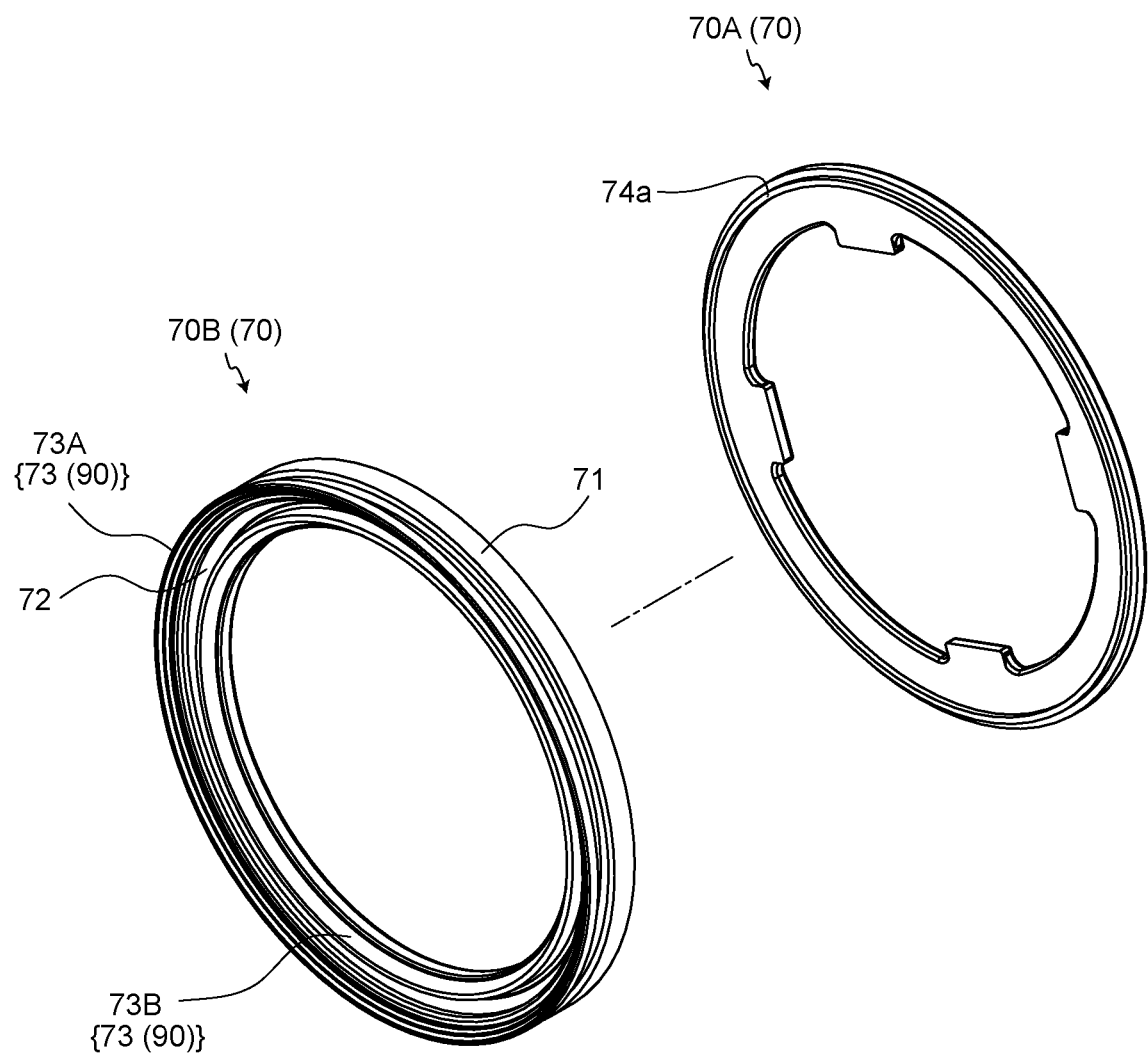
FIG. 10 is an exploded perspective view of the waterstop member as viewed from another angle.

The second waterstop member 70B includes: a first annular portion 71 that is brought into close contact with the outer circumferential surface 30$a_3$ of the outer peripheral edge 30$a$ of the flange 30 over one circumference in the circumferential direction; and a second annular portion 72 that covers the second annular wall surface 30$a_2$ of the outer peripheral edge 30$a$ of the flange 30 over one circumference in the circumferential direction (FIGS. 4, 9, and 10). Therefore, the outer peripheral edge 30$a$ of the flange 30 is sandwiched in the axial direction by the first waterstop member 70A and the second annular portion 72 of the second waterstop member 70B, and is covered in a close contact state from the outside in the radial direction by the first annular portion 71 of the second waterstop member 70B (FIG. 4). Here, the first annular portion 71 and the second annular portion 72 are formed in an annular shape (FIGS. 9 and 10).

In the second waterstop member 70B, the first annular portion 71 protrudes from the outer end in the radial direction of the second annular portion 72 toward the outer end in the radial direction of the first waterstop member 70A in one hole axial direction (FIG. 4). In the waterstop member 70, the annular end surface on the one hole axial direction side in the first annular portion 71 is connected to the annular end portion on the outer side in the radial direction in the first waterstop member 70A. This allows, in the waterstop member 70, to use the first annular portion 71 and the second annular portion 72 in the first waterstop member 70A and the second waterstop member 70B to be annular fitting portions, and the outer peripheral edge 30$a$ of the flange 30 is fitted into an annular space between these members.

With this configuration, the fitting portion of the waterstop member 70 fills a gap with the outer peripheral edge 30$a$ of the flange 30 with at least between the outer circumferential surface 30$a_3$ of the outer peripheral edge 30$a$ and the first annular portion 71 of the second waterstop member 70B, making it possible to suppress passage of a liquid (water or the like) through the gap. Accordingly, the waterstop member 70 can prevent entry of a liquid such as water from the vehicle exterior into the vehicle interior between the outer peripheral edge 30$a$ of the flange 30 and the waterstop member 70.

Furthermore, in a case where the first waterstop member 70A in the waterstop member 70 on the vehicle exterior side is a member that cannot suppress elastic deformation, for example, a liquid such as high-pressure water from a car washer or the like splashed on the grommet 1 from the vehicle exterior side would turn up the first waterstop member 70A and expand the gap between the first waterstop member 70A and the outer peripheral edge 30$a$ of the flange 30. However, the first waterstop member 70A in the waterstop member 70 can suppress elastic deformation in practice, and thus, a high-pressure liquid splashed to the grommet 1 from the vehicle exterior side would not deform the first waterstop member 70A. Accordingly, the waterstop member 70 has a configuration in which liquids from the vehicle exterior are less likely to enter between the first waterstop member 70A and the outer peripheral edge 30$a$ of the flange 30, making it possible to enhance the effect of suppressing the entry of a liquid such as water from the vehicle exterior to the vehicle interior.

Furthermore, the second waterstop member 70B has a contact portion 73 that has an annular shape and, while being elastically deformed, is brought into contact with the peripheral edge 501$a$ of the flat plate portion 501 over one circumference in the circumferential direction, thereby achieving close contact with the peripheral edge 501$a$ over one circumference in the circumferential direction (FIGS. 2, 4 to 7, 9, and 10). The contact portion 73 protrudes from the second annular portion 72 in the other hole axial direction, thereby protruding from the second annular portion 72 in the other hole axial direction of the through hole 502 when the grommet 1 is attached to the peripheral edge 501$a$ of the flat plate portion 501. The waterstop member 70 has the contact portion 73 that fills the gap with the peripheral edge 501$a$ of the flat plate portion 501, making it possible to suppress passage of a liquid (water or the like) through the gap. Accordingly, the waterstop member 70 can prevent entry of a liquid such as water from the vehicle exterior into the vehicle interior between the peripheral edge 501$a$ of the flat plate portion 501 and the waterstop member 70. The contact portion 73 illustrated here is formed in an annular shape. The waterstop member 70 illustrated here includes, as the contact portion 73, a first contact portion 73A on the outer side in the radial direction and a second contact portion 73B on the inner side in the radial direction (FIGS. 4 to 7, 9, and 10).

Here, the waterstop member 70 may be formed by two-color molding of either the first waterstop member 70A or the second waterstop member 70B, or may be formed by forming the first waterstop member 70A and the second waterstop member 70B as separate components and fixing the first annular portion 71 of the first waterstop member 70A and the second waterstop member 70B with an adhesive or the like.

The first waterstop member 70A illustrated here has a projection 74$a$ with an annular shape (hereinafter, referred to as an "annular projection 74$a$") coaxially protruding toward the first annular portion 71 of the second waterstop member 70B at an annular end on the outer side in the radial direction thereof (FIGS. 4 and 10). The first annular portion 71 of the second waterstop member 70B illustrated here has a groove 74$b$ with an annular shape (hereinafter, referred to as an "annular groove 74$b$") with which the annular projection 74$a$ is fitted and connected (FIGS. 4 and 9). When two-color molding is adopted for the waterstop member 70, the annular groove 74$b$ is formed in the second waterstop member 70B by forming the second waterstop member 70B together with the first waterstop member 70A with the annular projection 74$a$. In the waterstop member 70, the annular projection 74$a$ and the annular groove 74$b$ contribute to the effect of anti-stripping between the first waterstop member 70A and the second waterstop member 70B. In addition, in a case where the waterstop member 70 has a configuration in which the first waterstop member 70A and the second waterstop member 70B as separate parts are assembled, the annular projection 74$a$ and the annular groove 74$b$ achieve a positioning function of the first waterstop member 70A and the second waterstop member 70B in addition to the anti-stripping effect.

The grommet 1 configured as described above includes a holding mechanism 90 that allows the base member 10X assembled together (the first base member 10 and the second base member 20 assembled to each other), and the waterstop member 70, to be held onto the peripheral edge 501$a$ of the flat plate portion 501 (FIGS. 2 and 4 to 7). The holding mechanism 90 illustrated here uses elastic resilience accompanying elastic deformation of the contact portion 73 (the first contact portion 73A and the second contact portion 73B) of the waterstop member 70, and sandwiches and holds the peripheral edge 501$a$ of the flat plate portion 501 between a projection 15$a$ provided on the base member 10X (provided on each of the first base member 10 and the second base member 20) and the contact portion 73 (the first contact portion 73A and the second contact portion 73B). However, the peripheral edge 501$a$ illustrated here is provided with a coaxial cylindrical portion 501$b$ having a cylindrical shape and protruding in the axial direction (FIGS. 2 to 5). Accordingly, the holding mechanism 90 illustrated here sandwiches and holds the cylindrical portion 501b of the peripheral edge 501a between the projection 15a and the contact portion 73 (the first contact portion 73A and the second contact portion 73B) in the axial direction (hole axial direction of the through hole 502) (FIG. 4). The holding mechanism 90 is provided in plurality around the axis.

Specifically, each of the first base member 10 and the second base member 20 illustrated here includes: the projection 15a that protrudes beyond an outer circumferential surface 14a of the split cylinder 14 and is disposed on the other hole axial direction side of the through hole 502 beyond the peripheral edge 501a of the flat plate portion 501; and a flexible piece portion 15b that is cantilever, and in which the projection 15a is provided on the free end side and the projection 15a is bent by a force received from the inner circumferential surface of the peripheral edge 501a (FIGS. 2 to 7). The flexible piece portion 15b has its fixed end side disposed in a groove 14b obtained by cutting out a part of the split cylinder 14 from the outer circumferential surface 14a side, with a fixed end of the flexible piece portion 15b connected to a groove bottom of the groove 14b. Each of the first base member 10 and the second base member 20 illustrated here is provided with two sets of combinations of the projection 15a, the flexible piece portion 15b, and the groove 14b.

In the holding mechanism 90, when the cylindrical body 50 (the split cylinders 14 of the first base member 10 and the second base member 20) is gradually inserted into the through hole 502 of the flat plate portion 501, the projection 15a receives a force from the inner circumferential surface of the peripheral edge 501a of the flat plate portion 501, and the flexible piece portion 15b enters the groove 14b while being bent. At the same time, the contact portion 73 (the first contact portion 73A and the second contact portion 73B) of the second waterstop member 70B in the waterstop member 70 comes into contact with the peripheral edge 501a of the flat plate portion 501 and elastically deforms gradually. In the holding mechanism 90, when the insertion of the cylindrical body 50 into the through hole 502 is continued and the projection 15a enters the other hole axial direction side of the through hole 502 beyond the peripheral edge 501a of the flat plate portion 501, the bending of the flexible piece portion 15b is canceled, and the projection 15a is located to face the peripheral edge 501a on the other hole axial direction side of the through hole 502. When the insertion of the cylindrical body 50 into the through hole 502 is stopped accordingly, the grommet 1 is pushed back to the side opposite to the insertion direction to the through hole 502 by elastic resilience accompanying the elastic deformation of the contact portion 73 (the first contact portion 73A and the second contact portion 73B).

Therefore, in the holding mechanism 90, the projection 15a is locked to the peripheral edge 501a of the flat plate portion 501 on the other hole axial direction side of the through hole 502, and the peripheral edge 501a is pinched and held between the elastically deformed contact portion 73 (the first contact portion 73A and the second contact portion 73B) and the projection 15a.

Here, in the first base member 10 and the second base member 20, the projection 15a, the flexible piece portion 15b, and the groove 14b are formed by a mold (not illustrated). For this reason, in the first base member 10 and the second base member 20, a cast hole 11a (FIG. 8) for extracting the mold remains in the split flange 11, and the vehicle exterior and the vehicle interior are connected via the cast hole 11a. Therefore, each of the first base member 10 and the second base member 20 has a waterproof member (hereinafter, "second waterproof member") 82 to fill the cast hole 11a (FIGS. 4 to 8).

The second waterproof member 82 is formed by using a synthetic resin material such as elastomer, for example. The second waterproof member 82 may be produced by two-color molding with the first base member 10 and the second base member 20, or may be formed as a separate part, fitted into the cast hole 11a so as to be fixed with an adhesive or the like.

In the grommet 1, the gap is not completely closed between the tubular body 40 and the wiring member We. Therefore, the grommet 1 includes a closing member (not illustrated) that closes the gap between the tubular body 40 and the wiring member We from the outside. The closing member is, for example, a resin tape to be wound around the tubular body 40 and the wiring member We, and is wound between the outer circumferential surface of the tubular body 40 and the wiring member We extracted from the tubular body 40. In this example, the corrugated tube COT protrudes from the tubular body 40. Therefore, the closing member is wound from the outer circumferential surface of the tubular body 40 to the outer circumferential surface of the corrugated tube COT, and further wound to the wiring member We extracted from the corrugated tube COT.

As described above, the grommet 1 of the present embodiment does not need a tube expanding work for the passage of the wiring member We. The grommet 1 of the present embodiment adopts a split structure, and even with this structure, the first base member 10 and second base member 20 as split members are formed of a hard resin that can suppress occurrence of elastic deformation. Therefore, in the grommet 1, by assembling the first base member 10 and the second base member 20 without particularly considering the positioning of their individual joint surfaces 10a, it is possible to suppress the positional displacement of the individual joint surfaces 10a. Furthermore, the grommet 1 of the present embodiment has a configuration in which the second waterstop member 70B formed of a soft resin is interposed between the first base member 10 and second base member 20 and the peripheral edge 501a of the flat plate portion 501. Therefore, the grommet 1 not only allows the second waterstop member 70B to implement the waterproof function between the portions, but also causes the second waterstop member 70B to absorb the force from the peripheral edge 501a to suppress transmission of the force to the first base member 10 and the second base member 20 formed of hard resin, making it also possible to suppress the positional deviation of their individual joint surfaces 10a after the members are attached to the peripheral edge 501a. Therefore, the grommet 1 of the present embodiment can improve assembling workability while ensuring waterproofness.

Furthermore, the grommet 1 of the present embodiment includes the first waterstop member 70A formed of a hard resin on the side opposite to the second waterstop member 70B and the peripheral edge 501a of the flat plate portion 501 with respect to the outer peripheral edge 30a of the flange 30 formed with the first base member 10 and the second base member 20. In addition, the grommet 1 has a configuration in which the first waterstop member 70A is disposed at a position capable of covering the first annular wall surface $30a_1$ of the outer peripheral edge 30a over one circumference in the circumferential direction, and the first waterstop member 70A is connected to the second waterstop member 70B formed of a soft resin on the outer side in the radial direction. The grommet 1 can suppress deformation of the first waterstop member 70A due to an external force, and therefore, even when liquid such as high-pressure water described above is splashed to the first waterstop member 70A, the grommet would suppress deformation of the first waterstop member 70A. Therefore, the grommet 1 according to the present embodiment suppress entry of a liquid such as water between the first waterstop member 70A and the outer peripheral edge 30a of the flange 30, making it possible to improve waterproofness.

Furthermore, the grommet 1 of the present embodiment can be attached to the peripheral edge 501a and held by the peripheral edge 501a only by pushing the grommet 1 until the projection 15a enters the other hole axial direction side of the through hole 502 beyond the peripheral edge 501a of the flat plate portion 501. Therefore, the grommet 1 enables further improvement in assembling workability.

The wire harness WH of the present embodiment includes the grommet 1, and thus can similarly achieve the effect exhibited by the grommet 1.

The grommet according to the present embodiment includes a first waterstop member that is formed of a hard resin on a side opposite to a second waterstop member and a peripheral edge of a flat plate portion with respect to an outer peripheral edge of a flange formed with a first base member and a second base member. In addition, the grommet has a configuration in which the first waterstop member is disposed at a position capable of covering an annular wall surface of the outer peripheral edge over one circumference in the circumferential direction, and the first waterstop member is connected to the second waterstop member formed of a soft resin on the outer side in the radial direction. The grommet can suppress deformation of the first waterstop member due to an external force, and therefore, even when a liquid such as high-pressure water is splashed to the first waterstop member, for example, the grommet would suppress deformation of the first waterstop member. Therefore, the grommet according to the present embodiment suppress entry of a liquid such as water between the first waterstop member and the outer peripheral edge of the flange, making it possible to improve waterproofness. The wire harness according to the present embodiment includes the grommet, and thus similarly achieve the effect exhibited by the grommet.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
a base member which is formed of an insulating hard resin and through which a wiring member being a conductive member and passing through a through hole of a flat plate portion is inserted;
a waterstop member having an annular shape and assembled to the base member; and
a holding mechanism that holds the base member and the waterstop member assembled with each other onto a peripheral edge of the through hole in the flat plate portion, wherein
the base member includes: a flange having an annular shape and in which an outer peripheral edge having a shape similar to the peripheral edge having an annular shape is disposed to face the peripheral edge with a gap in one hole axial direction of the through hole and the wiring member is inserted through an inside of an inner peripheral edge;
a tubular body that protrudes from the inner peripheral edge of the flange in the one hole axial direction and allows passage of the wiring member inside the body; and a cylindrical body whose cross section orthogonal to a hole axis of the through hole has a shape similar to the peripheral edge, the cylindrical body protruding from the flange in the other hole axial direction of the through hole inside the outer peripheral edge so as to be inserted through the through hole,
the waterstop member includes a first waterstop member and a second waterstop member in an integrated state outside a radial direction, the first waterstop member having an annular shape, formed of the hard resin or a hard resin different from the hard resin having a hardness equivalent to a hardness of the hard resin, and configured to cover an annular wall surface on the one hole axial direction side in the outer peripheral edge of the flange over one circumference in a circumferential direction, the second waterstop member having an annular shape, formed of a soft resin softer than the hard resin and elastically deformable, and configured to be in close contact with at least an outer circumferential surface of the outer peripheral edge of the flange over one circumference in the circumferential direction, and
the second waterstop member has a contact portion having an annular shape and configured to be, in elastically deformed state, in close contact with the peripheral edge over one circumference in the circumferential direction.

2. The grommet according to claim 1, wherein
the base member includes a first base member and a second base member configured to be assembled to each other by aligning individual joint surfaces together, so as to sandwich the wiring member, and
each of the first base member and the second base member includes: a split flange that forms the flange by aligning the joint surfaces of the individual base members together; a split tube that forms the tubular body by aligning the joint surfaces of the individual base members together; and a split cylinder that forms the cylindrical body by aligning the joint surfaces of the individual members together.

3. A wire harness comprising:
a wiring member being a conductive member; and
a grommet through which the wiring member is inserted, wherein
the grommet includes: a base member which is formed of an insulating hard resin and through which the wiring member passing through a through hole of a flat plate portion is inserted; a waterstop member having an annular shape and assembled to the base member; and a holding mechanism that holds the base member and the waterstop member assembled with each other onto a peripheral edge of the through hole in the flat plate portion,
the base member includes: a flange having an annular shape and in which an outer peripheral edge having a shape similar to the peripheral edge having an annular shape is disposed to face the peripheral edge with a gap in one hole axial direction of the through hole and the wiring member is inserted through an inside of an inner peripheral edge;
a tubular body that protrudes from the inner peripheral edge of the flange in the one hole axial direction and allows passage of the wiring member inside the body; and a cylindrical body whose cross section orthogonal to a hole axis of the through hole has a shape similar to the peripheral edge, the cylindrical body protruding from the flange in the other hole axial direction of the through hole inside the outer peripheral edge so as to be inserted through the through hole, the waterstop member includes a first waterstop member and a second waterstop member in an integrated state outside a radial direction, the first waterstop member having an annular shape, formed of the hard resin or a hard resin different from the hard resin having a hardness equivalent to a hardness of the hard resin and configured to cover an annular wall surface on the one hole axial direction side in the outer peripheral edge of the flange over one circumference in a circumferential direction, the second waterstop member having an annular shape, formed of a soft resin softer than the hard resin and elastically deformable, and configured to be in close contact with at least an outer circumferential surface of the outer peripheral edge of the flange over one circumference in the circumferential direction, and the second waterstop member has a contact portion having an annular shape and configured to be, in elastically deformed state, in close contact with the peripheral edge over one circumference in the circumferential direction.

4. The wire harness according to claim 3, further comprising:

a closing member that closes a gap between the tubular body and the wiring member from outside.

* * * * *